(12) United States Patent
Byun et al.

(10) Patent No.: US 9,368,780 B2
(45) Date of Patent: Jun. 14, 2016

(54) RECHARGEABLE BATTERY HAVING PILLAR TERMINAL AND BATTERY MODULE USING THE SAME

(71) Applicant: SAMSUNG SDI CO., LTD., Yongin-si, Gyeonggi-do (KR)

(72) Inventors: Sang-Won Byun, Yongin-si (KR); Gwan-Chan Jeon, Yongin-si (KR); Hyun-Soo Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 107 days.

(21) Appl. No.: 14/245,128

(22) Filed: Apr. 4, 2014

(65) Prior Publication Data

US 2015/0079446 A1 Mar. 19, 2015

(51) Int. Cl.
*H01M 2/30* (2006.01)
*H01M 2/20* (2006.01)
*H01M 2/26* (2006.01)

(52) U.S. Cl.
CPC .............. *H01M 2/30* (2013.01); *H01M 2/263* (2013.01)

(58) Field of Classification Search
CPC .................. H01M 2/26; H01M 2/30
See application file for complete search history.

(56) References Cited

U.S. PATENT DOCUMENTS

| 2011/0244308 | A1* | 10/2011 | Byun | .................... H01M 2/204 429/158 |
| 2011/0244309 | A1 | 10/2011 | Byun et al. | |
| 2012/0021277 | A1* | 1/2012 | Byun | .................. H01M 2/0469 429/178 |

FOREIGN PATENT DOCUMENTS

| JP | 2011-060778 A | 3/2011 |
| KR | 10-2010-0081484 A | 7/2010 |
| KR | 10-2011-0109843 A | 10/2011 |

* cited by examiner

*Primary Examiner* — Carlos Barcena
(74) *Attorney, Agent, or Firm* — Lee & Morse, P.C.

(57) ABSTRACT

A rechargeable battery including a pillar terminal electrically connected to a positive or negative electrode. The pillar terminal includes a first section made of a first metal, a second section made of a second metal, and a third section between the first and second sections. The third section is made of the first metal or the second metal. The third section is welded to the first section and is electroplated to the second section.

14 Claims, 8 Drawing Sheets

US 9,368,780 B2

RECHARGEABLE BATTERY HAVING PILLAR TERMINAL AND BATTERY MODULE USING THE SAME

CROSS-REFERENCE TO RELATED APPLICATION

Korean Patent Application No. 10-2013-0111332, filed on Sep. 16, 2013, and entitled, "Rechargeable Battery Having Pillar Terminal and Battery Module Using The Same," is incorporated by reference herein in its entirety.

BACKGROUND

1. Field

One or more embodiments described herein relate to a battery.

2. Description of the Related Art

Unlike a primary battery, a rechargeable battery can be repeatedly charged and discharged. Low-capacity rechargeable batteries are used in portable devices such as mobile phones, notebook computers, and camcorders. High-capacity rechargeable batteries are widely used as power sources for hybrid and electric vehicles.

When used as a power source for a vehicle, a plurality of battery cells are connected by one or more bus bars to form a rechargeable battery module. Such a module includes an electrode assembly for charging and discharging. The electrode assembly includes a separator between positive and negative electrodes. The negative electrode includes a negative electrode current collector and a negative active material layer, while the positive electrode includes a positive electrode current collector and a positive active material layer.

The negative electrode current collector is made of aluminum and the positive current collector is made of copper. A negative terminal electrically connected to the negative electrode is made of aluminum, while a positive terminal electrically connected to the positive electrode is made of copper.

Because the melting point of aluminum is different from copper, it is difficult to bond the different metals by welding. In attempt to solve this problem, the terminals or bus bars of the battery module may be bonded by friction welding. However, friction welding increases manufacturing costs and decreases productivity.

SUMMARY

In accordance with one embodiment, a rechargeable battery includes an electrode assembly including a first electrode and a second electrode; a case including the electrode assembly; and a first pillar terminal electrically connected to the first electrode, wherein the first pillar terminal includes a first section made of a first metal, a second section made of a second metal, and an intermediate section made of the first metal or the second metal and located between the first and second sections.

The intermediate section may be made of the second metal and electroplated on a surface of the first section. A flange may protrude from a circumferential surface of the first section. The intermediate section may be welded to the second section.

The intermediate section may be made of the first metal and electroplated on a surface of the second section and welded to the first section. The first pillar terminal may have a substantially cylindrical shape, and the first and second sections may be elongated in a height direction of the first pillar terminal.

The intermediate section may be made of a clad metal, the intermediate section may include a first bonding layer made of the first metal and a second bonding layer made of the second metal, and the first bonding layer may be welded to the first section and the second bonding layer may be welded to the second section.

The first section may include a first coupling portion, and the second section may include a second coupling portion coupled to the first coupling portion. The first coupling portion may be formed with a groove or protrusion. The intermediate section may cover the first coupling portion.

In accordance with another embodiment, a battery module includes a plurality of rechargeable batteries and a bus bar electrically connecting the plurality of rechargeable batteries, wherein each rechargeable battery includes an electrode assembly having a first electrode and a second electrode, a case including the electrode assembly, and a first pillar terminal electrically connected to the first electrode, wherein the first pillar terminal has a first section made of a first metal and a second section made of a second metal, and an intermediate section made of the first metal or the second metal and located between the first and second sections.

The intermediate section may be made of the second metal and may be electroplated on a surface of the first section. A flange may protrude from a circumferential surface of the first section, and the intermediate section may be welded to the second section.

The intermediate section may be made of the first metal, and the intermediate section may be welded to the first section and electroplated to the second section. The intermediate section may be made of a clad metal, the intermediate section may include a first bonding layer made of the first metal and a second bonding layer made of the second metal, and the first bonding layer may be welded to the first section and the second bonding layer may be welded to the second section.

A second pillar terminal may be electrically connected to the second electrode, the second pillar terminal may be made of the second metal, and the bus bar may be made of the second metal. The first section may include a first coupling portion, and the second section may include a second coupling portion coupled to the first coupling portion.

In accordance with one embodiment, a rechargeable battery includes a first electrode; a second electrode; and a first pillar terminal electrically connected to the first electrode, wherein the first pillar terminal includes a first section made of a first metal, a second section made of a second metal, and a third section between the first and second sections and made of the first metal or the second metal. The third section may be welded to the first section. The third section may be electroplated on the second section.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
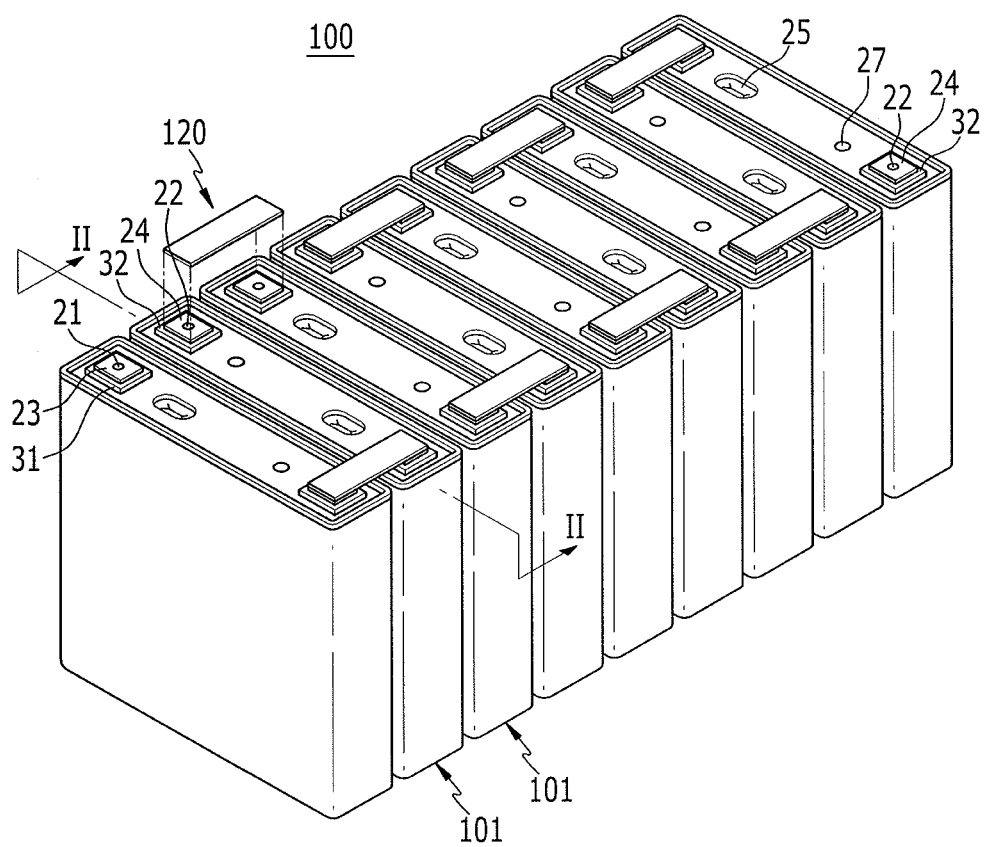
FIG. 1 illustrates an embodiment of a battery module.

Example embodiments are described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Figure 2:
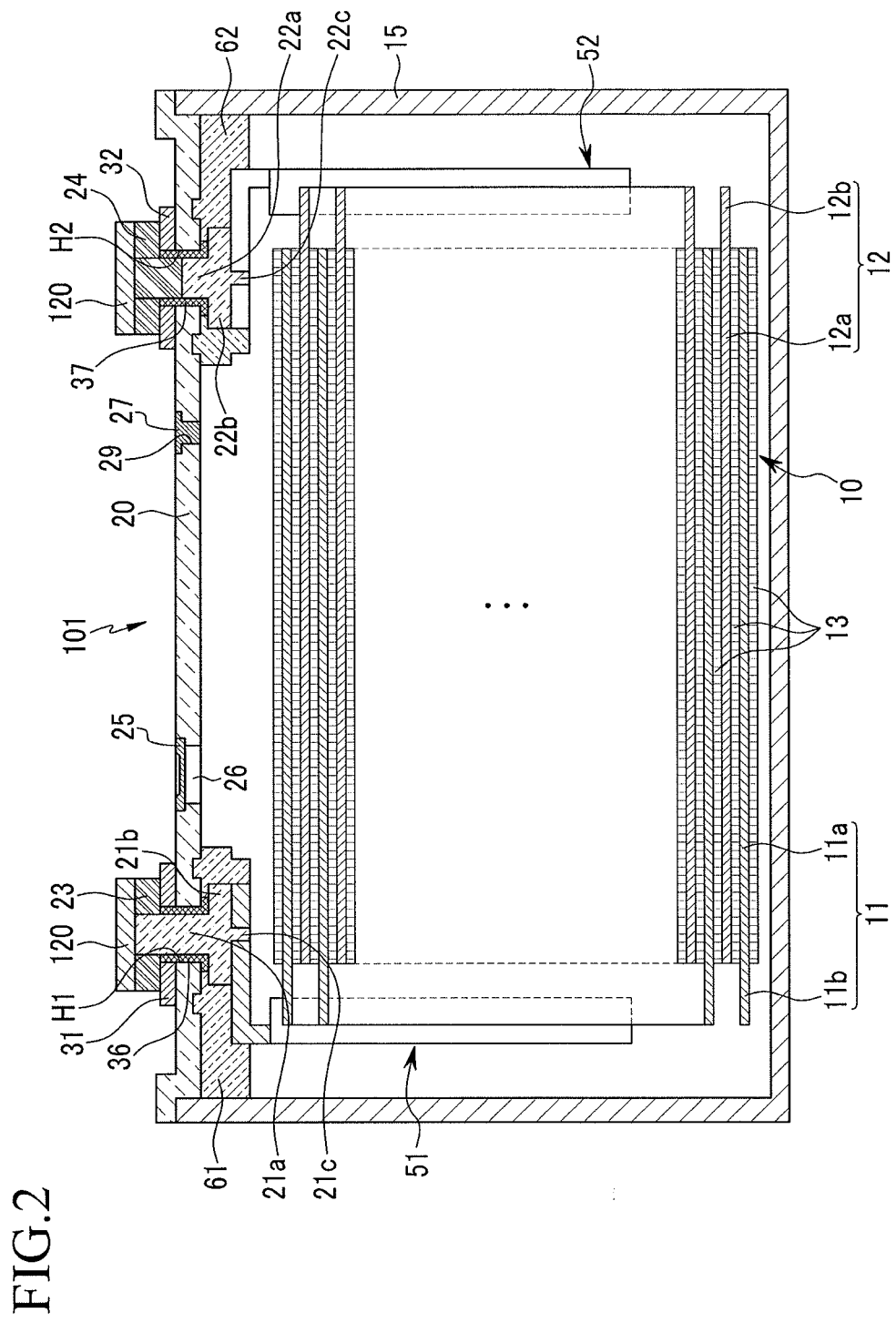
FIG. 2 illustrates a view taken along section line II-II in FIG. 1.

FIG. 1 illustrates an embodiment of a battery module 100, and FIG. 2 illustrates a cross-sectional view of FIG. 1 taken along line II-II. Referring to FIG. 1, battery module 100 includes a plurality of rechargeable batteries 101 and bus bars 120 electrically connecting the rechargeable batteries 101. The batteries 101 are illustrated as prism-shaped lithium ion rechargeable batteries. However, batteries 101 may have a different shape or may be of a different type in other embodiments. For example, batteries 101 may be lithium polymer batteries or cylindrical batteries.

Each rechargeable battery 101 includes an electrode assembly 10 to be used for charging and discharging, a case 15 in which the electrode assembly 10 is located, a cap plate 20 coupled to an opening of the case 15, and first and second pillar terminals 22 and 21 provided in the cap plate 20. In one embodiment, electrode assembly 10 is formed by disposing a first electrode (e.g., a negative electrode) 12 and a second electrode (e.g., a positive electrode) 11 at respective sides of a separator 13. The separators 13 may serve as insulators. The negative electrode 12, separator 13, and positive electrode 11 may be spirally wound, for example, in a jelly-roll shape.

The positive and negative electrodes may respectively include coated regions 11a and 12a, in which an active material is coated on a current collector. The positive and negative electrodes may also respectively include uncoated regions 11b and 12b having exposed portions of the current collector, on which the active material is not coated.

The positive electrode uncoated region 11b is formed at a lateral end of the positive electrode 11 along the spirally wound positive electrode 11. The negative electrode uncoated region 12b is formed at a lateral end of the negative electrode 11 along the spirally wound negative electrode 12. The positive and negative uncoated regions 11b and 12b are disposed at opposite ends of the electrode assembly 10.

Case 15 may have, for example, a roughly cuboid shape and may be used to store the electrode assembly 10 and an electrolyte solution. One side of the cuboid is formed with an opening connecting inner and outer spaces thereof. The opening is formed to allow the electrode assembly 10 to be inserted into the case 15.

The cap plate 20 closes and seals the case 15 by being disposed over the opening thereof. Case 15 and cap plate 20 may be formed, for example, of aluminum and may be welded to each other.

In addition, cap plate 20 may be formed with an electrolyte injection opening 29, a vent hole 26, and terminal holes H1 and H2. The electrolyte injection opening 29 enables the electrolyte solution to be injected into the case 15 after combining the cap plate 20 to the case 15. The electrolyte injection opening 29 is closed and sealed by a sealing cap 27 after the electrolyte solution is injected. The vent hole 26 is closed and sealed by a vent plate 25, which may be used to release internal pressure of the rechargeable battery 101. For example, when the internal pressure of rechargeable battery 10 reaches a predetermined level, the vent plate 25 is ruptured to open the vent hole 26. The vent plate 25 is formed with a notch that induces the rupture.

The first and second pillar terminals 22 and 21 are provided to penetrate the cap plate 20. For example, first pillar terminal 22 is inserted into terminal hole H2 and second pillar terminal 21 is inserted into terminal hole H1. The first pillar terminal 22 is electrically connected to the negative electrode 12 of the electrode assembly 10. The second pillar terminal 21 is electrically connected to the positive electrode 11 of the electrode assembly 10. Accordingly, a charged current in the electrode assembly 10 is drawn out of the case 15 through the first and second pillar terminals 22 and 21.

A plate terminal 23 is provided at an upper portion of the second pillar terminal 21. The second pillar terminal 21 is bonded to the plate terminal 23 by welding while being inserted into the plate terminal 23. The plate terminal 23 is formed with a hole, and the second pillar terminal 21 is inserted in the hole.

An upper insulating member 31 is provided between cap plate 20 and plate terminal 23, to insulate the plate terminal 23 from the cap plate 20.

A positive electrode gasket 36 is provided between the cap plate 20 and second pillar terminal 21. The positive electrode gasket 36 is inserted into the terminal hole H1, to seal the space between second pillar terminal 21 and cap plate 20 and electrically insulates them.

A positive electrode lead tab 51 is coupled to the positive electrode 11. The positive electrode lead tab 51 electrically connects the second pillar terminal 21 to the first electrode 11, and may be bonded to the positive electrode uncoated region 11b and the second pillar terminal 21, for example, by welding.

A lower insulating member 61 is provided between positive lead tab 51 and cap plate 20, to electrically insulate positive lead tab 51 from the cap plate 20. In addition, one side of the lower insulating member 61 is coupled to cap plate 20, and the other side encloses the positive lead tab 51 and second pillar terminal 21, to stabilize the connecting structure.

The second pillar terminal 21 includes a column portion 21a, a flange portion 21b protruding from an external circumferential surface of the column portion 21a, and a supporting protrusion 21c protruding down from a bottom side of the column portion 21a. The column portion 21a may be formed, for example, in a circular cylinder shape, and the flange portion 21b may be roughly formed, for example, in a square plate shape. The supporting protrusion 21c is fitted into the positive lead tab 51 and is fixed thereto, for example, by welding.

An upper portion of the first pillar terminal 22 is provided with a plate terminal 24. The first pillar terminal 22 is bonded to the plate terminal 24, for example, by welding, while being inserted into plate terminal 24. The plate terminal 24 is formed with a hole, and the first pillar terminal 22 is inserted into the hole.

An upper insulating member 32 is provided between plate terminal 24 and cap plate 20, to insulate the plate terminal 24 from the cap plate 20.

A negative electrode gasket 37 is provided between the cap plate 20 and the first pillar terminal 22. The negative electrode gasket 37 is inserted into terminal hole H2, to seal the space between the first pillar terminal 22 and the cap plate 20 and electrically insulates them.

A negative electrode lead tab 52 is coupled to the negative electrode 12. The negative electrode lead tab 52 electrically connects the first pillar terminal 22 to the negative electrode 12, and is bonded to the negative electrode uncoated region 12b and the first pillar terminal 22, for example, by welding.

A lower insulating member 62 is provided between the negative electrode lead tab 52 and the cap plate 20, to electrically insulate them. In addition, one side of the lower insulating member 62 is coupled to the cap plate 20. The other side encloses the negative electrode lead tab 52 and the first pillar terminal 22, thereby stabilizing the connecting structure.

Figure 3:
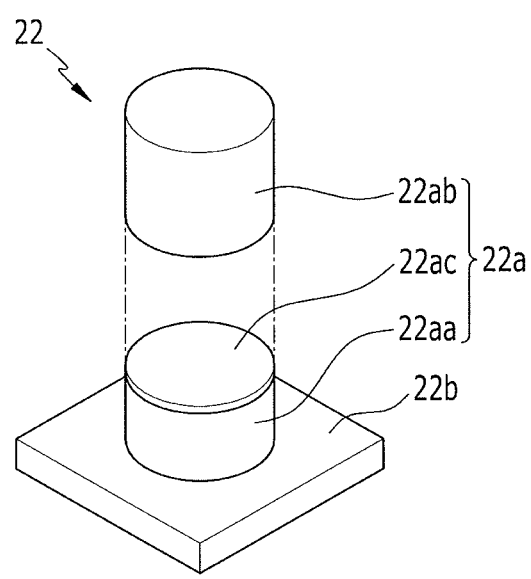
FIG. 3 illustrates a first embodiment of a pillar terminal.
Figure 4:
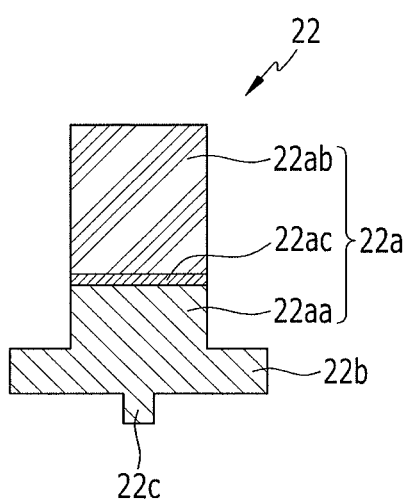
FIG. 4 illustrates a sectional view of the pillar terminal.

FIG. 3 illustrates a first embodiment of the pillar terminal, and FIG. 4 illustrates a vertical cross-sectional view of this pillar terminal. Referring to FIGS. 2 to 4, the first pillar terminal 22 includes a column portion 22a, a flange portion 22b protruding from an external circumferential surface of the column portion 22a, and a supporting protrusion 22c protruding down from a bottom side of the column portion 22a.

The column portion 22a is formed in a circular cylinder shape. The flange portion 22b is roughly formed in a square plate shape. The supporting protrusion 22c is fitted into the negative electrode lead tab 52 and is fixed thereto, for example, by welding.

The column portion 22a includes a first part 22aa formed of a first metal, a second part 22ab formed of a second metal different from the first metal, and an intermediate layer 22ac disposed between the first part 22aa and the second part 22ab. The flange portion 22b is combined to an outer side of the first part 22aa. The first metal may be copper, while the second metal may be aluminum. The first and second parts 22aa and 22ab are combined to form a circular cylinder, and are bonded through the intermediate layer 22ac.

The first and second parts 22aa and 22ab are bonded and disposed to be elongated in a height direction of the circular cylinder. The intermediate layer 22ac is made of the second metal, and may be formed at a top side of the first part 22aa by electroplating.

When the intermediate layer 22ac is formed by electroplating, the intermediate layer 22ac formed of aluminum can be integrally formed on the first part 22aa formed of copper. The width of the intermediate layer 22ac may have a thickness different from that shown, but in one non-limiting embodiment should be thick enough to allow for welding.

It has been shown to be difficult to bond different metals of different melting points by welding. This is because a welding fault may occur as a result of the different melting points. For example, a welding fault may form as a metal with a high melting point does not melt, while a metal with a low melting point melts.

However, if intermediate layer 22ac made of one metal (e.g., aluminum) is formed on first part 22as made of a different metal (e.g., copper), for example, by electroplating, the first and second parts 22aa and 22ab can be integrally formed. The first and second parts 22aa and 22ab may be welded, for example, by laser welding or resistance welding, such that the interface of the intermediate layer 22ac and the second part 22ab is melted and bonded.

In the case where intermediate layer 22ac is made of the same material as the second part 22ab, welding is easily performed and therefore sufficient strength is guaranteed at the welded part.

In one embodiment, the second pillar terminal 21 is formed of the second metal, which is the same metal as the second part 22ab, and the bus bar 120 is made of the second metal. Further, the plate terminal 23 may coupled to second pillar terminal 21 may be made of the second metal. The plate terminal 24 coupled to the second part 22ab of the first pillar terminal 22 may be made of the second metal.

The bus bar 120 is welded to plate terminals 23 and 24, to allow the second pillar terminal 21 to be electrically connected to the first pillar terminal 22.

As described above, because the second pillar terminal 21, the second part 22ab, the plate terminals 23 and 24, and the bus bar 120 are made of the same metal (e.g., aluminum), they can be easily welded to each other.

Figure 5:
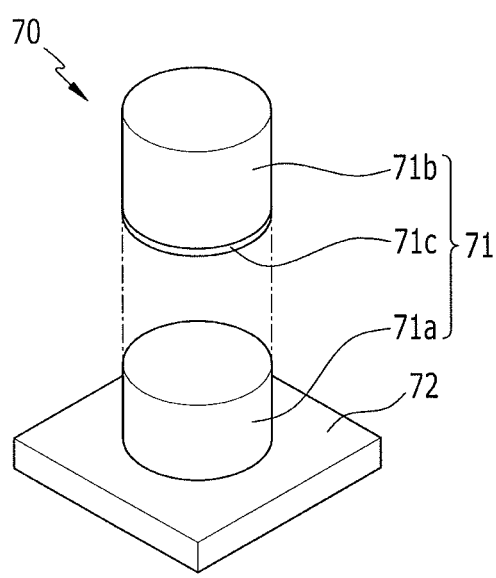
FIG. 5 illustrates a second embodiment of a pillar terminal.

FIG. 5 illustrates a second embodiment of a pillar terminal. The second embodiment of a rechargeable battery including the pillar terminal may have the same structure as the first embodiment of the rechargeable battery, except for first pillar terminal 70.

The first pillar terminal 70 includes a column portion 71, a flange portion 72, and a supporting protrusion protruding down from a bottom side of flange portion 72.

The column portion 71 is formed in a circular cylinder shape. The flange portion 72 is formed to protrude outwards from an external circumferential side of the column portion 71. The column portion 71 includes an intermediate layer 71c between first and second parts 71a and 71b.

The intermediate layer 71c is formed at a bottom side of the second part 71b, for example, by plating and is formed of a different material from the second part 71b. In one embodiment, intermediate layer 71c may be formed by chemical plating. Various methods can be applied to form, for example, a copper layer by chemical plating. In one embodiment, the first part 71a is made of copper, the second part 71b is made of aluminum, and the intermediate layer 71c is made of copper. The flange portion 72 is coupled to a lower end of an external circumferential surface of the first part 71a.

As described above, because the second part 71b is formed with intermediate layer 71c formed of the same material as the first part 71a, the first pillar terminal 70 (with its upper and lower parts being formed of different materials) can be easily made, for example, by welding the intermediate layer 71c and the first part 71a together.

Figure 6:
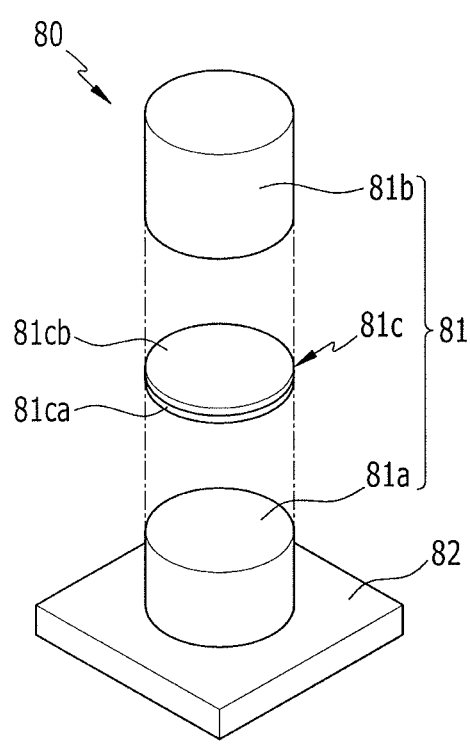
FIG. 6 illustrates a third embodiment of a pillar terminal.
Figure 7:
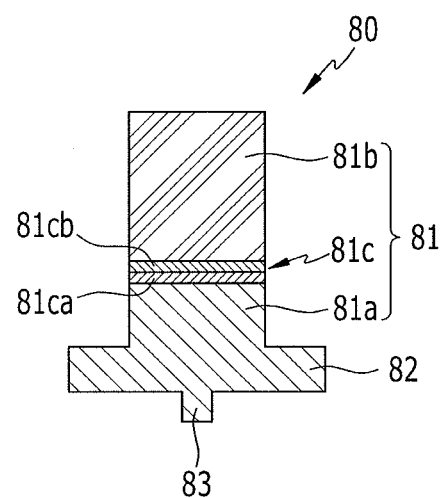
FIG. 7 illustrates a sectional view of the third pillar terminal embodiment.

FIG. 6 illustrates a third embodiment of a pillar terminal, and FIG. 7 illustrates a vertical cross-sectional view of the pillar terminal. Referring to FIGS. 6 and 7, because the rechargeable battery including the pillar terminal has the same structure as the first embodiment of the rechargeable battery, except for a first pillar terminal 80.

The first pillar terminal 80 includes a column portion 81, a flange portion 82, and a supporting protrusion 83 protruding from a bottom side of flange portion 82. The column portion 81 is formed in a circular cylinder shape, and the flange portion 82 is formed to protrude outwards from an external circumferential side of the column portion 81.

The column portion 81 includes a first part 81a, a second part 81b, and an intermediate layer 81c disposed between the first and second parts 81a and 81b. The flange portion 82 is coupled to a lower end of an external circumferential surface of the first part 81a. The intermediate layer 81c is made of a clad metal, and includes a first bonding layer 81*ca* and a second bonding layer 81*cb*. The intermediate layer 81*c* is formed in a disk shape.

The first part 81*a* is made of the first metal, and the second part 81*b* is made of the second metal. In addition, the first bonding layer 81*ca* is made of the first metal, and the second bonding layer 81*cb* is made of the second metal. For example, the first metal may be copper and the second metal may be aluminum.

The first bonding layer 81*ca* is disposed to contact the first part 81*a*, and the second bonding layer 81*cb* is disposed to contact the second part 81*b*. The first bonding layer 81*ca* is bonded to the first part 81*a* by welding, and the second bonding layer 81*cb* is bonded to the second part 81*b* by welding.

Because the first bonding layer 81*ca* is made of the same material as the first part 81*a* and the second bonding layer 81*cb* is made of the same material as the second part 81*b*, the first part 81*a* and the intermediate layer 81*c* can be easily welded and the second part 81*b* and intermediate layer 81*c* can be easily welded.

Figure 8:
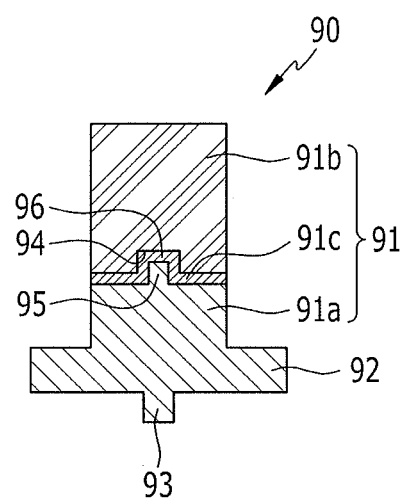
FIG. 8 illustrates a sectional view of a fourth embodiment of a pillar terminal.

FIG. 8 illustrates a fourth embodiment of a pillar terminal. Because a rechargeable battery including the pillar terminal has the same structure as the first embodiment of the rechargeable battery, except for a first pillar terminal 90.

The first pillar terminal 90 includes a column portion 91, a flange portion 92, and a supporting protrusion 93 protruding from a bottom side of flange portion 92. The column portion 91 is formed in a circular cylinder shape, and the flange portion 92 is formed to protrude outwards from an external circumferential side of the column portion 91.

The column portion 91 includes an intermediate layer 91*c* between first and second parts 91*a* and 91*b*. The flange portion 92 is coupled to a lower end of an external circumferential surface of the first part 91*a*. The intermediate layer 91*c* is formed at a top side of the first part 91*a*, for example, by plating and is made of a different material from the first part 91*a*.

When the intermediate layer 91*c* is formed by plating, the intermediate layer 91*c* (formed of a different material from the first part 91*a*) may be integrally formed with the first part 91*a*. The first part 91*a* is made of the first metal, and the second part 91*b* and the intermediate layer 91*c* are made of the second metal. For example, the first metal may be copper and the second metal may be aluminum.

A first coupling portion 95 is formed at a center of the first part 91*a*. A second coupling portion 94, to be fitted into the first coupling portion 95, is formed in the second part 91*b*. In one embodiment, the first coupling portion 95 is formed with a protrusion, while the second coupling portion 94 is formed with a groove.

However, the first coupling portion 95 and the second coupling portion 94 may be fitted into each other. In this case, the first coupling portion 95 may be formed with a groove, and the second coupling portion 94 may be formed with a protrusion. In one embodiment, the first coupling portion 95 is formed in a quadrangular prism shape. However, the first coupling portion 95 may be formed to have a different shape (e.g., a polygonal column shape) in other embodiments.

The intermediate layer 91*c* is formed to enclose the first coupling portion 95. A convex portion 96 covering the first coupling portion 95 is formed in the intermediate layer 91*c*.

As described above, when the first and second coupling portions 95 and 94 are formed, the contact area of the second part 91*b* and the intermediate layer 91*c* increases to thereby decrease resistance. As a result, the first pillar terminal 90 is prevented from being broken, for example, due to external impact and vibration. Further, when the intermediate layer 91*c* and the second part 91*b* are welded together, they can be easily aligned.

When the first and second coupling portions 95 and 94 are welded together while being fitted into each other, the strength of the first pillar terminal 90 is improved. As a result, the welded part can be prevented from being broken as a result external impact or vibration.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A rechargeable battery, comprising:
an electrode assembly including a first electrode and a second electrode;
a case including the electrode assembly; and
a first pillar terminal electrically connected to the first electrode, wherein the first pillar terminal includes a first section made of a first metal, a second section made of a second metal different from the first metal, and an intermediate section made of the first metal or the second metal and located between the first and second sections, and wherein:
the first section includes a first coupling portion,
the first coupling portion is formed with a groove or protrusion, and
the second section includes a second coupling portion coupled to the first coupling portion.

2. The rechargeable battery as claimed in claim 1, wherein:
the intermediate section is made of the second metal and the intermediate section is electroplated on a surface of the first section.

3. The rechargeable battery as claimed in claim 2, further comprising:
a flange protruding from a circumferential surface of the first section.

4. The rechargeable battery as claimed in claim 3, wherein the intermediate section is welded to the second section.

5. The rechargeable battery as claimed in claim 1, wherein:
the intermediate section is made of the first metal, and
the intermediate section is electroplated on a surface of the second section and welded to the first section.

6. The rechargeable battery as claimed in claim 1, wherein:
the first pillar terminal has a substantially cylindrical shape, and
the first and second sections are elongated in a height direction of the first pillar terminal.

7. The rechargeable battery as claimed in claim 1, wherein the intermediate section covers the first coupling portion.

8. A battery module, comprising:
a plurality of rechargeable batteries; and
a bus bar electrically connecting the plurality of rechargeable batteries,
wherein each rechargeable battery includes:
an electrode assembly having a first electrode and a second electrode, a case including the electrode assembly, and a first pillar terminal electrically connected to the first electrode, wherein the first pillar terminal has a first section made of a first metal and a second section made of a second metal different from the first metal, and an intermediate section made of the first metal or the second metal and located between the first and second sections, and wherein:

the first section includes a first coupling portion, the first coupling portion is formed with a groove or protrusion, and the second section includes a second coupling portion coupled to the first coupling portion.

9. A battery module as claimed in claim 8, wherein:

the intermediate section is made of the second metal, and the intermediate section is electroplated on a surface of the first section.

10. The battery module as claimed in claim 9, wherein:

a flange protrudes from a circumferential surface of the first section, and the intermediate section is welded to the second section.

11. The battery module as claimed in claim 8, wherein:

the intermediate section is made of the first metal, and the intermediate section is welded to the first section and electroplated to the second section.

12. The battery module as claimed in claim 8, wherein:

a second pillar terminal is electrically connected to the second electrode, the second pillar terminal is made of the second metal, and the bus bar is made of the second metal.

13. A rechargeable battery, comprising:

a first electrode;

a second electrode; and a first pillar terminal electrically connected to the first electrode, wherein the first pillar terminal includes a first section made of a first metal, a second section made of a second metal different from the first metal, and a third section between the first and second sections and made of the first metal or the second metal, and wherein:

the first section includes a first coupling portion, the first coupling portion is formed with a groove or protrusion, and the second section includes a second coupling portion coupled to the first coupling portion.

14. The rechargeable battery as claimed in claim 13, wherein the third section is welded to the first section.

\* \* \* \* \*